United States Patent [19]
Sykes

[11] 3,735,403
[45] May 22, 1973

[54] TRACKING RADAR
[75] Inventor: David F. Sykes, Lincoln, Mass.
[73] Assignee: Raytheon Company, Lexington, Mass.
[22] Filed: Aug. 2, 1971
[21] Appl. No.: 168,245

[52] U.S. Cl. ..............................343/16 R, 343/118
[51] Int. Cl. ...........................G01s 3/56, G01s 9/52
[58] Field of Search ....................343/7 A, 16 R, 118

[56] References Cited
UNITED STATES PATENTS

| | | | |
|---|---|---|---|
| 3,242,487 | 3/1966 | Hammack | 343/7 A |
| 3,230,525 | 1/1966 | Anema | 343/7 A |
| 3,166,745 | 1/1965 | Engledew et al | 343/7 A X |
| 2,845,622 | 7/1958 | Gamble | 343/16 R |
| 3,487,408 | 12/1969 | Clarke | 343/16 R X |
| 3,568,193 | 3/1971 | Barton | 343/16 R |

Primary Examiner—Malcolm F. Hubler
Attorney—Philip J. McFarland et al.

[57] ABSTRACT

A conical scan signal receiver using digital computation apparatus for calculating angle tracking data is disclosed. The angle tracking data of a selected target are digitally calculated by determining the relative level of target related energy between an "up" elevation channel, a "down" elevation channel, a "right" azimuthal channel and a "left" azimuthal channel.

6 Claims, 8 Drawing Figures

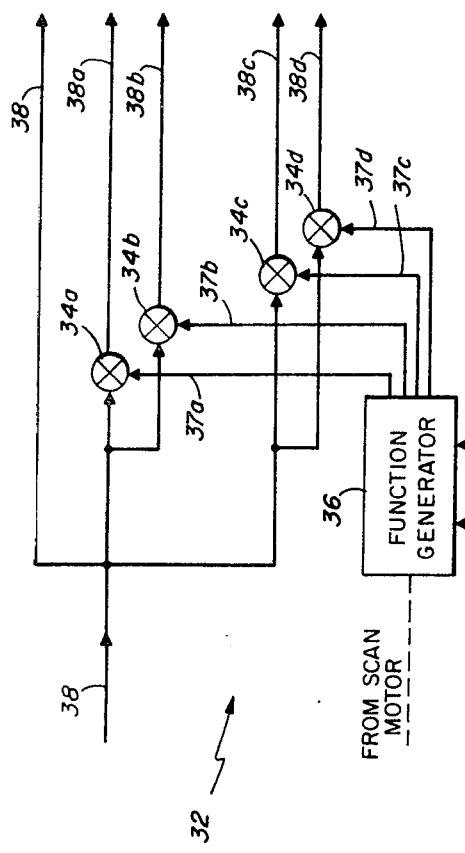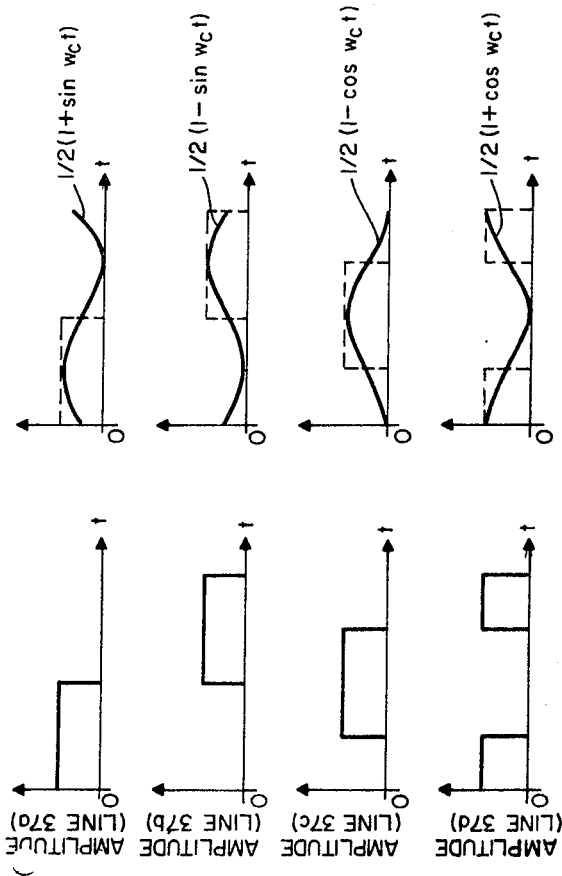
FIG. 2
FIG. 2A
FIG. 2B

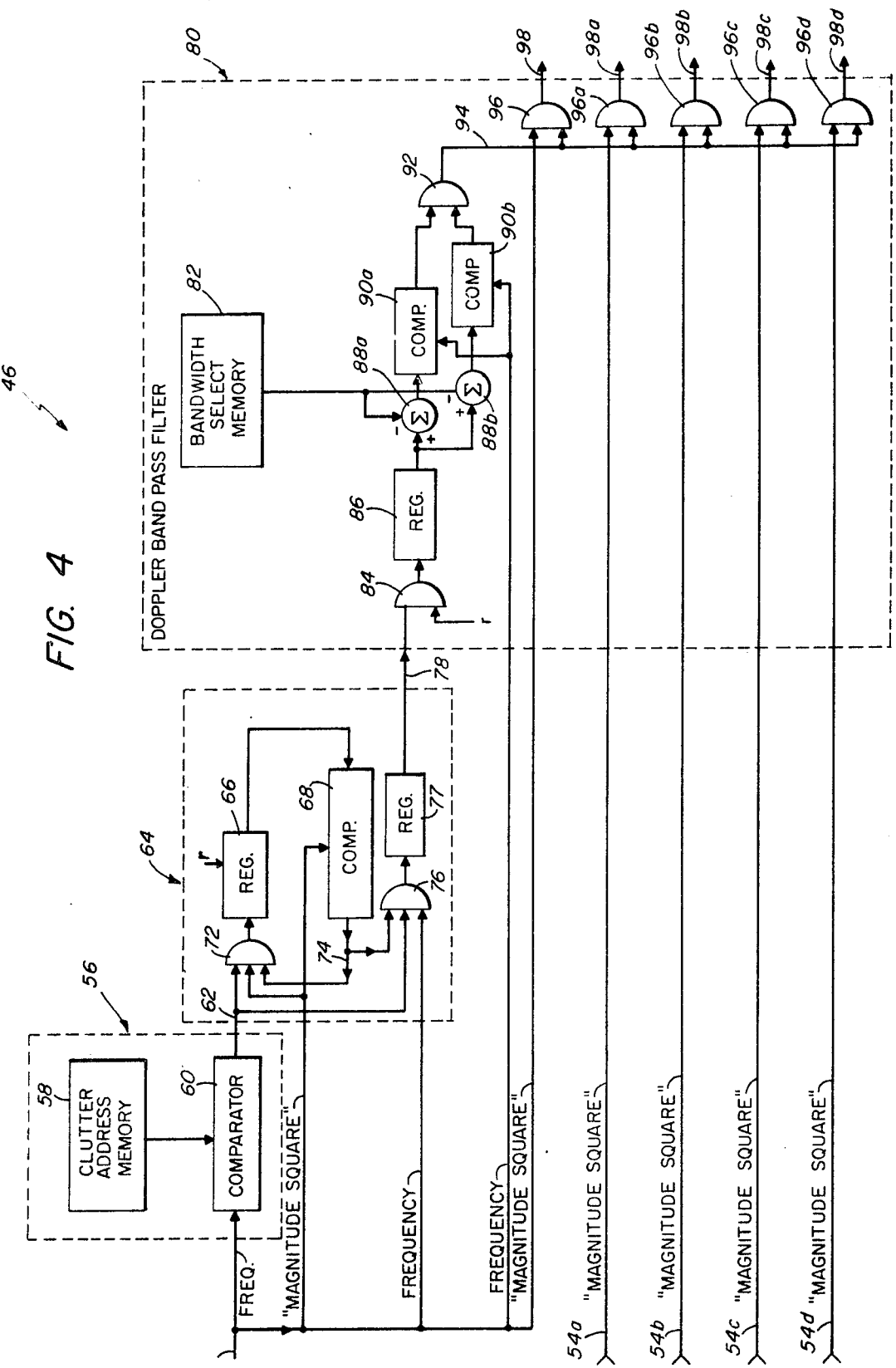

TRACKING RADAR

BACKGROUND OF THE INVENTION

This invention relates generally to signal receivers and more particularly to conical scan signal receivers employing digital processing apparatus.

As is known, conical scan signal receivers are sometimes used in a radar system to derive angle tracking data from radio frequency energy signals transmitted by such system and reflected by illuminated targets. Generally the axis along a beam formed by the receiving antenna is angularly offset from the boresight axis of such antenna in a manner such that as the beam rotates about the boresight axis at a rate $w_c$ each echo signal reflected by each target is amplitude modulated in the receiver by a modulating signal of frequency $2\pi w_2$. The modulation imposed on each echo signal from each target then is an indication of the target's angular position with respect to the boresight axis of the antenna. The amplitude of the modulated signal is proportional to the angle between the target and the antenna boresight axis and the phase of the modulated signal is proportional to the angle between the target and a reference axis related to the angle of rotation of the antenna beam. As is also known, in any practical application the conical scan receiver antenna may be responsive to echo signals reflected by clutter. However, it is generally necessary that the angle tracking data be derived only from echo signals from a target. Angle tracking data from the target may be derived by adjusting the bandpass of the receiver so that only echo signals from the target may be processed; that is, only echo signals at the Doppler frequency associated with the target are used to compute the angle tracking data. Such bandpass adjustment has, in the past, been performed by various analog apparatus which include a bank of narrow band filters, each one having a center frequency offset from the other so as to cover the range of expected target Doppler frequencies and an automatic frequency control (or phase control) arrangement to continuously track the target related Doppler frequency. Either technique generally has two modes of operation, an initial "search" mode and a terminal "track" mode. In the "search" mode the center frequency of the "bandpass" is generally "swept" periodically to determine the Doppler frequencies included in the received signal. An indication of all such Doppler frequencies is presented to an operator or automated decision making apparatus whereby a target is selected by its associated Doppler frequencies. The receiver is then placed in the "track" mode whereby the previously selected target is continuously tracked by means of its Doppler frequencies and the angle tracking data associated therewith is derived. In order to reduce the time required for the "search" mode, digital techniques using Fast Fourier Transform (FFT) apparatus may be employed in the receiver. For example, a plurality of such FFT apparatus may be used, each one being responsive to energy from reflections of targets which are within preassigned range intervals. Obviously it would be desirable to utilize the same FFT apparatus during the "track" mode as during the "search" mode rather than require additional, more conventional, analog frequency tracking apparatus such as are necessary to implement the arrangements noted above.

One known technique which uses FFT apparatus during the "search" and "track" mode includes, in the receiver, means for processing signals by treating the selected target as one which has a single Doppler frequency associated therewith. Such a technique, however, requires precise and coherent digital processing apparatus within the receiver to obviate errors caused by effects such as vibration of the physical structure of the target which cause echo signals from the detected target to appear as a band of Doppler frequencies, rather than a single Doppler frequency.

SUMMARY OF THE INVENTION

With this background of the invention in mind it is an object of the invention to provide a conical scan signal receiver wherein digital processing apparatus is used during both the "search" and "track" mode to process signals received by such receiver.

It is a further object of the invention to provide a conical scan signal receiver using digital processing apparatus wherein a target being tracked by such receiver is treated as having a band of Doppler frequencies.

These and other objects of the invention are attained generally by providing in a conical scan receiver, means for computing the angular deviation of a target from a boresight axis and a reference axis, such reference axis being disposed in a plane orthogonal to the boresight axis, such computing means including: Means for separating energy in signals received from various objects and a selected target between several signal channels, the relative level of the energy in each such signal channel being in accordance with the angular deviation of each one of the various objects and the target from the boresight axis and the reference axis; means or inhibiting energy at frequencies other than those related to the target from passing through the several signal channels; and means, fed by the several signal channels, for measuring the relative level of energy passing through the several signal channels.

BRIEF DESCRIPTION OF THE DRAWINGS

Other objects and many of the attendant advantages of the invention will be readily appreciated as the same become better understood by reference to the following detailed description when considered in connection with the accompanying drawings wherein:

FIG. 2 shows a modulator used in the receiver shown in FIG. 1;

FIGS. 2A-2B show exemplary modulating functions which may be applied in the "track" mode to the modulator shown in FIG. 2;

FIG. 3 shows a digital frequency spectrum generator used in the receiver shown in FIG. 1;

FIG. 4 shows a Doppler frequency detector and bandpass filter used in the receiver shown in FIG. 1;

DESCRIPTION OF THE PREFERRED EMBODIMENTS

Figure 1:
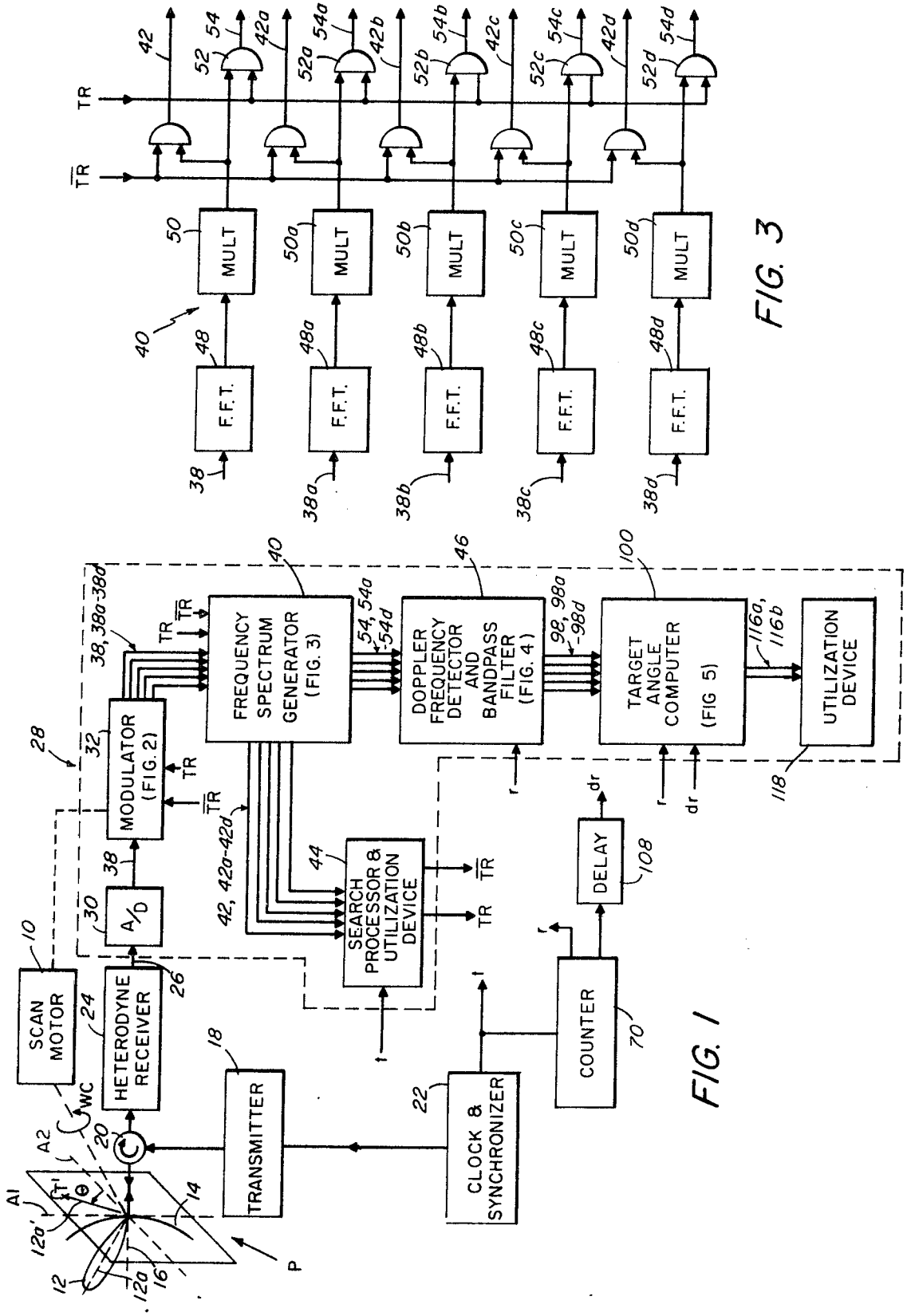
FIG. 1 shows a conical scan radar system including a receiver employing the principles of the invention.

Referring to FIG. 1 it should first be noted that, for convenience, a pulse Doppler radar system having a "search" and a "track" mode of operation has been selected to illustrate how the present invention may be applied. Thus, the illustrated system includes: A mechanism, here scan motor 10, for conically scanning a beam 12 formed by antenna 14 about boresight axis 16; a transmitter 18, coupled to antenna 14 through circulator 20, for transmitting pulses of radio frequency energy in response to control signals from clock and synchronizer 22; a heterodyne receiver 24 coupled to antenna 14 through circulator 20 for processing echo signals from reflections of each transmitted pulse by targets and clutter (not shown) within the beam 12 in a conventional manner to convert the radio frequency signal received by antenna 14 to a video frequency signal on line 26; and, digital processing apparatus 28 for digitally processing the video frequency signal in a manner so as to enable detection of the presence of a target during the "search" mode and to determine angle tracking data of such detected target during the "track" mode. It is here noted that the digital processing apparatus 28 here employs parallel digital computer processing techniques.

The operation of the pulse Doppler radar system during the "search" mode is conventional and therefore will be only briefly described. Thus, the video frequency signal on line 26 is digitized by A/D converter 30 and then processed by modulator 32 (FIG. 2). Modulator 32, the details of which will be discussed later in reference to the description of the "track" mode, includes multipliers 34a to 34d and a function generator 36. Suffice it to say here that during the "search" mode the amplitude of the envelope of digital signals on lines 37a to 37d are unity and therefore the signals on lines 38 (i.e., the output of A/D converter 30, FIG. 1), and lines 38a–38d are all identical. In other words, the modulator 32 simply multiplexes the digitized video signals into a plurality of channels, here five. The signals from modulator 32 are applied to digital frequency spectrum generator 40 (FIG. 3). The details of digital frequency spectrum generator 40 will be discussed later in reference to the description of the "track" mode. Suffice it to say here that such frequency spectrum generator produces signals during the "search" mode (i.e., when a signal is applied to line $\overline{TR}$) on lines 42, 42a to 42d, such signals representing the frequency spectrum of the digitized video frequency signal. The signals on lines 42, 42a to 42d are applied to the search processor and utilization device 44 (FIG. 1). The search processor and utilization device 44 is of conventional design and includes range gating apparatus (not shown) coupled to block and synchronizer 22 for gating the signals on lines 42, 42a to 42d. Such gating enables analysis to be made by an operator or automatic decision making apparatus of the frequency components of the video frequency signal within a selected range interval for indicating the presence of a target. When a target has been detected a "track" signal, TR, is produced by the search processor and utilization device 44 and the pulse Doppler radar system is thereby switched from its "search" to its "track" mode. (Likewise the signal on line $\overline{TR}$ is removed during the "track" mode).

Before describing the "track" mode of operation of the pulse Doppler radar system, the basic features of conical scanning will be discussed. Thus, as is well known, the effect of conical scanning on the video frequency signal produced by the heterodyne receiver 24 may be described by first defining plane P orthogonal to the boresight axis 16, such plane having a pair of axes $A_1$, $A_2$ therein and then noting the location of the projection, as T', of a target T (not shown) in such plane. The origin of axes $A_1$, $A_2$ is at the boresight axis 16. The projection of the axis 12a of beam 12 in the plane P may be represented by line 12a', such line 12a' being at an angle "$\theta$" with respect to a reference axis, as shown. It follows then that as the beam is conically scanned the level of the energy received by antenna 14 from target T varies in accordance with the displacement of the target projection T' from the origin of the axes $A_1$, $A_2$ and also in accordance with the angular deviation $\theta$ of line 12a' from the reference axis. Consequently the video frequency signal produced by the heterodyne receiver 24 may be represented by an amplitude modulated signal of the form: $A[1 + E \cos(w_c t + \theta)] e^{jw_d t}$ where:

A is the amplitude of the video frequency signal
E is related to the "length" of line 12a',
$w_c/2\pi$ is the conical scanning frequency, and
$w_d/2\pi$ is the Doppler frequency of the target, T.

From the foregoing it is apparent that angle tracking data related to target T may be derived determining angular deviation of T' from the axes $A_1$, $A_2$ after echo signals from target T have been isolated from other echo signals by reason of the particular Doppler frequencies associated with the target, T. That is, the bandpass of digital processing apparatus 28 during the "track" mode must be adjusted so as to select components of the video frequency signal which are related to the target, T, and must be made to operate on such selected components for the determination of the angle tracking data.

During the "track" mode, modulator 32 receives track signal TR from search processor and utilization device 44. During such "track" mode, function generator 36, being coupled to scan motor 10 (FIG. 1), periodically applies digital signals (here having an amplitude envelope as shown in FIG. 2A) to lines 37a to 37d. The modulator 32 thereby separates the digitized video signal into a reference channel (line 38), an "up" elevation channel (line 38a), a "down" elevation channel (line 38b), a "left" azimuthal channel (line 38c), and a "right" azimuthal channel (line 38d). The digital signals on lines 37a–37d are gating signals for separating the digitized video frequency signal into the channels described above. In each period, $2\pi/w_c$, the digital signals on line 37a have a unity amplitude envelope from time $t = 0$ (corresponding to the time when $\theta°$ equals "zero") to a time $t = \pi/w_c$ (i.e., when $\theta = 180°$). In each period the digital signal on line 37c has a unity amplitude envelope from $t = \pi/w_c$ to time $t = 2\pi/w_c$ and an amplitude of zero thereafter. Therefore, it may be seen that a measurement of the difference in level of the energy between signals in the "up" elevation channel and the "down" elevation channel is related to the "elevation location" of target, T. Likewise, because the signals on lines 37b and 37d (FIG. 2A) are 90° out of phase relative to the digital signals on lines 37a and 37c, the difference in energy level between signals in the "left" azimuthal channel and the "right" azimuthal channel is related to the "azimuthal location" of the target T. It will be noted that if clutter reflections contribute to the energy in the video frequency signal (on line 26, FIG. 1), the difference in energy level between the signals on line 38a and 38c (or lines 38b and 38d) will be related to the elevation and azimuthal locations, respectively, of the centroid of the total energy in such video frequency signal. Therefore, it is necessary to isolate the energy in the video frequency signal attributable to the target, T, and the energy from clutter reflections in order to determine the "elevation" and "azimuthal" location of such target. The first step in the required isolation process is accomplished by determining the frequency spectrum of the video frequency signal here by means of digital frequency spectrum generator 40 (FIG. 3). The second step is accomplished by rejecting all frequency components which are produced by clutter reflections by means of Doppler frequency detector and bandpass filter 46.

Digital frequency spectrum generator 40 (FIG. 3) includes digital Fast Fourier Transforms (FFT) 48, 48a–48d, each one of such FFT being connected to line 38 and lines 38a–38d to the modulator 32 as shown. Each FFT 48, 48a–48d is used in a conventional manner to compute the discrete Fourier Transform of signals applied to its input. The number of points, N, (i.e., batch size) used to compute such transform is related to scan period of the beam 12. In particular, the batch size, N. here is such that the video frequency signal information in at least one scan period is included in each batch. Each one of the FFT 48, 48a–48d is coupled to one of the multipliers 50, 50a–50d, respectively, as shown. As is known, the signal produced by each FFT 48, 48a–48d includes, for each frequency component, $w_i$, a "real" portion ($A(w_i)$) and an "imaginary" portion ($B(w_i)$). Each one of the multipliers 50, 50a–50d produces a signal which is the "magnitude square" of the energy at frequency component $w_i$ (i.e., $A_2(w_i) + B^2(w_i)$). It is here noted that the form of the signals at the output of each multiplier 50, 50a–50d is a time sequential series of digital words. The first portion of each digital word equals the "magnitude square" level of the energy at a frequency $w_i$ and the second portion equals the frequency $w_i$. During the "track" mode the track signal TR from search processor and utilization device 44 is applied to gates 52, 52a–52d (FIG. 3). Therefore, during the "track" mode the signals from multipliers 50, 50a–50d appear on lines 54, 54a–54d, respectively.

Doppler frequency detector and bandpass filter 46 (FIG. 4) is used to pass all frequency components related to the target, T. Such filter includes a "clutter frequency" rejection network 56 for rejecting energy from clutter reflections. Such network includes a clutter frequency memory 58 and a comparator 60 coupled to such memory and to the frequency portion of the word on line 54 as shown. Thus, comparator 60 compares the frequency of each frequency component contained in each frequency portion contained in the word appearing on line 54 with the frequencies stored in clutter address memory 58. The words stored in such memory are indicative of those frequencies which are, a priori, assumed to be frequencies associated with the clutter reflections. In a normal operating situation wherein the pulse Doppler radar system is used for tracking moving vehicles, the clutter frequencies would be relatively low compared with frequency of the target, T. Therefore, the comparator 60 is adapted to produce a gating signal on line 62 when the frequency portion of the word on line 54 represents a frequency larger than any of the frequencies represented by the words stored in the clutter frequency memory 58. Doppler frequency detector and bandpass filter 46 also include means 64 for finding the Doppler frequency of the detected target T. Such means 64 includes a register 66 and a comparator 68 arranged as shown. The register 66 is coupled to a counter 70 (FIG. 1) such that in addition to an initial reset signal "$r$" at $t = 0$ a reset signal "$r$" is applied to register 66 at the end of each batch. The "magnitude square" energy level of each word appearing on the "magnitude square" portion of the word on line 54 is compared with the level of the signal stored in register 66 by means of comparator 68. At the start of each batch such register 66 is reset to 0 by reset signal "$r$". A gating signal is produced by comparator 68 each time the level of the "magnitude square" on the "magnitude square" portion of the word on line 54 is greater than the level of the signal stored previously in register 66. When such gating signal is produced by comparator 68 each successive "magnitude square" signal in a batch in the "magnitude square" portion of the word on line 54 is gated through gate 72 and is stored in register 66, provided that a gating signal exists on line 62 (i.e., that the frequency of the signal passing through gate 72 is outside of the a priori assumed clutter frequencies). A little thought will make it apparent that at the end of each batch register 66 will have stored therein the largest "magnitude square" energy signal contained with the batch. As will be described, the frequency of the largest "magnitude square" energy level signal is stored in register 77 and such frequency corresponds to the center frequency of the band of frequencies related to echo signals from the target, T. The gating signal from comparator 68 is also transmitted to AND gate 76. AND gate 76 is also connected to line 62 and the frequency portion of the word on line 54, as shown. Consequently, after each batch is processed the word indicative of the center frequency of the band of frequencies related to echo signals from the target, T, is stored in register 77 in a manner similar to the storage process described for register 66. The output of register 77 appears as a signal on line 78 and such signal represents the frequency of the "Doppler frequency". The "Doppler frequency" $wd/2\pi$ is the center frequency of the Doppler bandpass filter 80 for the next batch of signals to be processed.

As is known, it is necessary to compute the angle tracking data from the band of frequencies associated with the target in the vicinity of the "Doppler frequency" in order to eliminate the need for precise and coherent digital processing apparatus. Doppler bandpass filter 80 is provided to pass frequencies within a bandwidth $W_{BP}/(2\pi)$ about the "Doppler frequency" $wd/2\pi$. (Normally $w_{BP}/(2\pi)$ is slightly larger than $w_c/\pi$). The bandpass filter operates on the assumption that the "Doppler frequency" computed in a previous batch is the same for the present batch. Such Doppler bandpass filter includes a bandwidth select memory 82. The bandwidth select memory 82 stores the "half" bandwidth frequency $w_{BP}(2(2\pi))$. When a reset signal "$r$" is applied to AND gate 84 the "Doppler frequency" on line 78 (i.e., the frequency component which had the largest "magnitude square" value as computed in the previous batch) is passed to register 86 and stored therein. Summers 88a and 88b are coupled to register 86 and bandwidth select memory 82 as shown. Comparators 90a and 90b are coupled to summers 88a and 88b as shown and to the frequency portion of the word on line 54. The signal from summer 88a represents a frequency $(wd-(w_{BP})/2)/2\pi$ and the signal from summer 88b represents $(wd+(w_{BP})2)/2\pi$.

The frequency portion of each word on line 54 in the next batch to be processed is applied to comparators 90a and 90b. So long as the frequency portion of each such word is greater than $wd-(w_{BP})/2)/2\pi$ a gating signal is supplied by comparator 90a to gate 92 and so long as such frequency portion is less than $wd+(w_{BP})/2)/2\pi$ a gating signal is supplied by comparator 90b to gate 92. If gating signals are supplied by both comparator 90a and 90b to AND gate 92 such gate in turn supplies, through line 94, a gating signal to AND gates 96, 96a–96d. In other words, if the frequency portion of a word is within the bandpass of Doppler bandpass filter 80, a gating signal is applied through line 94 to AND gates 96, 96a –96d so that the "magnitude square" signals on lines 54, 54a to 54d are passed to lines 98, 98a –98d. Therefore, the energy in each frequency component within $(wd\pm(w_{BP})/2)/2\pi$ (i.e., those components associated with the target, T) is coupled out of Doppler frequency detector and bandpass filter 46 through lines 98, 98a–98d and energy from clutter reflections are rejected by such filter. It is noted that lines 98, 98a –98d carry target related energy signals in the reference channel, "up" elevation channel, "down" elevation channel, "left" azimuthal channel and "right azimuthal channel, respectively. It is noted that during the present batch processing a new "estimate" is being made of the "Doppler frequency" for the next subsequent batch.

Figure 5:
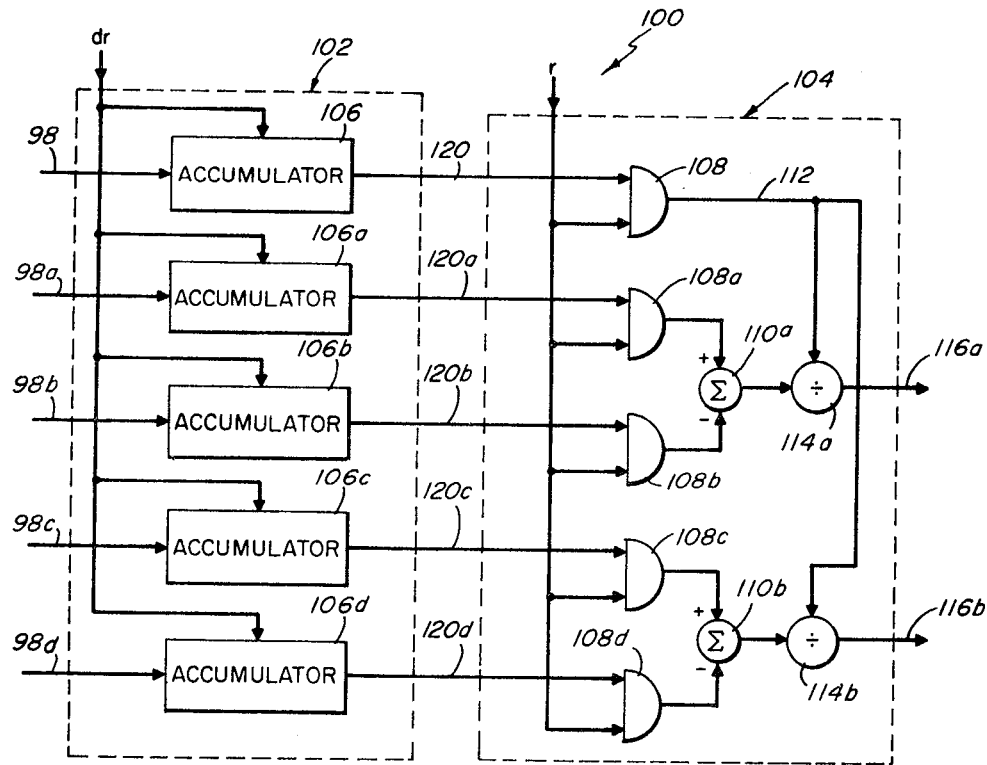
FIG. 5 shows a target angle computer for use in the receiver shown in FIG. 1.

Target angle computer 100 (FIG. 1) is used: (1) to compare the target T energy produced signals in the "up" elevation channel with those in the "down" elevation channel and also, in like manner, the "left" azimuthal channel with the "right" azimuthal channel, and (2) to normalize the receiver by the target energy appearing in the reference channel. In particular, the target angle computer 100 (FIG. 5) includes an accumulator section 102 and a compution section 104. The accumulator section 102 includes accumulators 106, 106a–106d, connected as shown to lines 98, 98a–98d respectively. The accumulators 106, 106a–106d, are reset after the end of each batch by a delayed reset signal, $dr$. Such delayed reset signal $dr$ is supplied by a delay 108 (FIG. 1). In operation, during each batch processed the "magnitude square" level of all frequency components passing through Doppler filter detector and bandpass filter 46 (FIG. 1) (i.e., those frequencies associated with the target T) are added in the accumulators 106, 106a–106b. It is noted that accumulators 106, 106a–106d are adding all energy levels associated with the target T in a manner whereby such accumulators process signals in the reference "up" elevation, "down" elevation, "left" azimuthal and "right" azimuthal channels, respectively. The computer section 104 includes AND gates 108, 108a–108d, connected to accumulators 106, 106a–106d respectively, as shown. AND gates 108, 108a–108d are all connected to reset signal "$r$". The accumulators are reset a short time after such reset signal, $r$, is applied to such gates so that the accumulator outputs passing through such gates are proper quantities. Also included in the computer section 104 are summers 110a and 110b. Summer 110a is connected to AND gates 108a, 108b, as shown, such that the output signal from such summer represents the difference between the "up" elevation channel signal and the "down" elevation channel signal, i.e., the "elevation" location of the target. Likewise, summer 110b is connected to AND gates 108c, 108d as shown such that the output signal from such summer represents the "azimuthal" location of the target. The signals produced at the output of summers 110a, 110b are normalized by the signal on line 112 (i.e., the reference signal channel) by means of dividers 114a, 114b. The output signals (on lines 116a, 116b) of such dividers thereby provide a measurement of the normalized "elevation" and "azimuthal" locations of the target. Such output signal on lines 116a, 116b are fed to utilization device 118 FIG. 1). Such utilization device may be any convenient device, here a conventional display.

During the "track" mode, function generator 36 (FIG. 2) may periodically apply signals having an amplitude envelope as shown in FIG. 2B to lines 37a–37d as an alternative to those shown in FIG. 2A. In particular, the amplitude envelope of the digital signals on lines 37a–37d can be described by the following functions respectively: $\frac{1}{2}(1+\sin w_c t)$; $\frac{1}{2}(1-\sin w_c t)$; $\frac{1}{2}(1-\cos w_c t)$; $\frac{1}{2}(1+\cos w_c t)$. As indicated by the dotted lines shown in FIG. 2B, the amplitude envelopes shown therein are merely approximations to the amplitude envelopes shown in FIG. 2A. A little thought will make it apparent, therefore, that the use of the functions shown in FIG. 2B will in effect separate the digitized video signal on line 21 (FIGS. 1 and 2) into an "up" elevation channel, "down" elevation channel, "left" azimuthal and "right" azimuthal channel as in the previously described embodiment.

Figure 6:
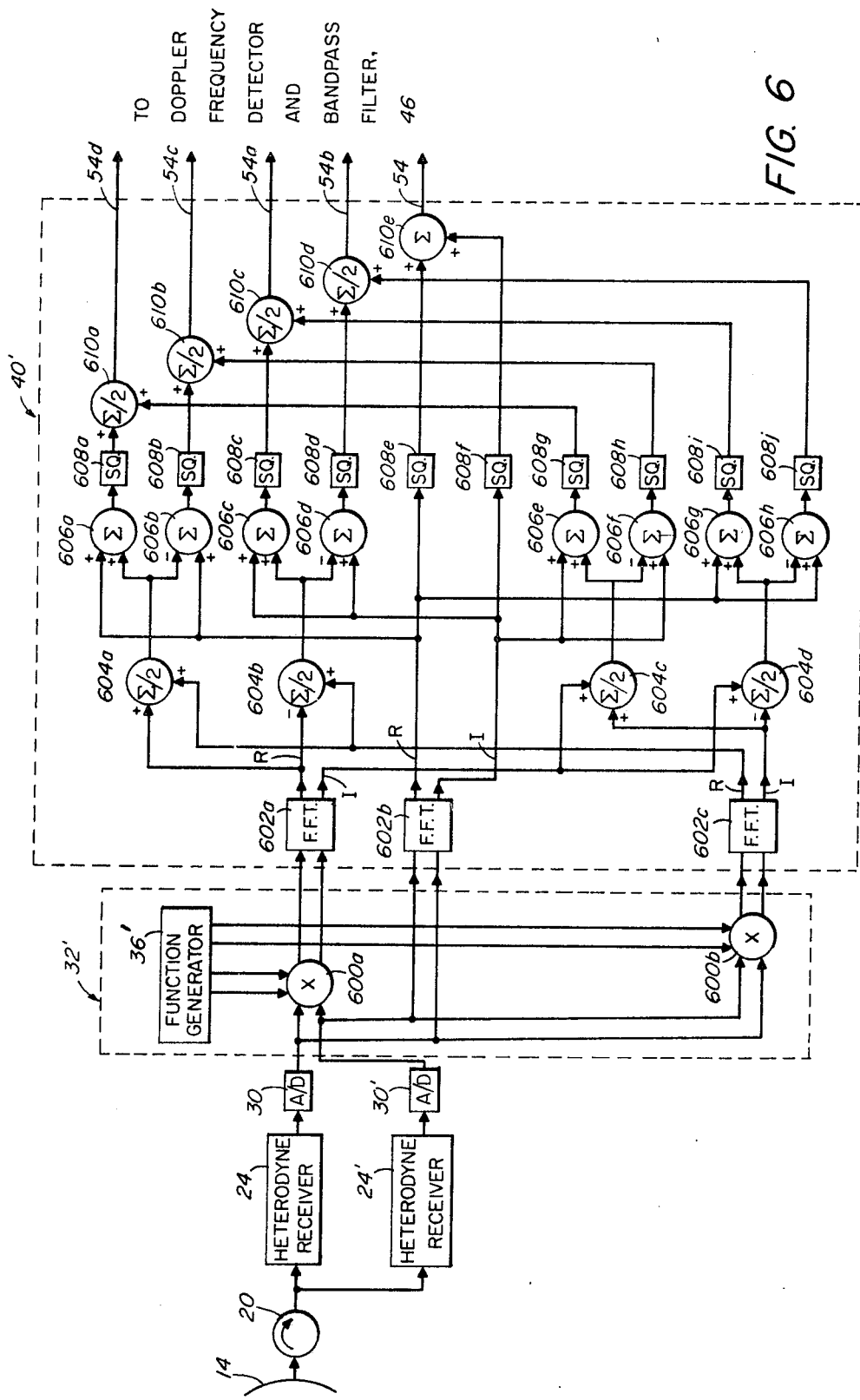
FIG. 6 shows an alternate embodiment of the invention.

Referring now to FIG. 6, the radar system described in reference to FIG. 1 has been modified to include, in addition to heterodyne receiver 24, a heterodyne receiver 24', the latter such receiver having its local oscillator (not shown) 90° out of phase with the local oscillator (not shown) of the former receiver. Therefore, as is well known, the signals produced at the outputs of A/D converters 30 and 30' (FIG. 6) may be considered to represent complex digital words describing the analog signals out of the heterodyne receivers 24, 24'. In particular, the signals at the output of A/D converter 30, 30' may be considered as representing the "real" portion and the signals at the output of A/D converter 30' the "imaginary" portion of such complex words. The signals produced at the outputs of A/D converters 30, 30' are fed to modulator 32' which includes a function generator 36' and complex multipliers 600a, 600b, connected as shown. Function generator 36' supplies digital words to complex multipliers 600a, 600b in the manner shown. Such digital words may be represented respectively as: $\cos w_c t + j \sin w_c t$ and $\cos w_c t - j \sin w_c t$. *Consequently, two sets of complex words in addition to the complex words produced by A/D converters 30, 30' are developed at the output of modulator 32'.* The complex words (i.e., signals) developed at the output of modulator 32' are fed to frequency spectrum generator 40'. Such generator includes FFTs 602a, 602b, 602c. Each one of the FFTs is fed by one set of the three complex signals at the output of modulator 32' in the manner shown. The signals produced by such FFTs are complex, the "real" portion and the "imaginary" portion appearing on lines lettered R and I, respectively. Adder/dividers 604a – d are connected to FFT 602a and 602c as shown so that the signals from the former may be considered as representing, respectively: $F \cos w_c t$; $\hat{F} \sin w_c t$; $jF \cos w_c t$; $jF \sin w_c t$ (where F and $\hat{F}$ correspond, respectively, to the "real" portion and the "imaginary" portion of the complex signals produced at the output of FFT 602b). The signals produced at the output of adder/dividers 604a – d and FFT 602b are fed to adders 606a – h as shown. The signals to the adders 606a – h are selectively added to the signals from FFT 602b so that the signals produced at the outputs of summers 606a –b may be represented as, respectively: $F(1 + \cos w_c t)$; $F(1 - \cos w_c t)$; $\hat{F}(1 + \sin w_c t)$; $\hat{F}(1 - \sin w_c t)$; $j\hat{F}(1 + \cos w_c t)$; $j\hat{F}(1 - \cos w_c t)$; $jF(1 - \sin w_c t)$; $jF(1 + \sin w_c t)$. The signals produced at the output of adders 600a – 600b and at the output of FFT 602b are squared by squarers 608a – j and are selectively fed to adder/dividers 610a – e as shown. The signals on lines 54, 54a – d may therefore be represented as, respectively, $|F_T|^2$; $|F_T/2(1 + \sin w_c t)|^2$; $|F_T(1 - \sin w_c t)|^2$; $|F_T(1 - \cos w_c t)|^2$; $|F_T/2(1 + \cos w_c t)|^2$ where $F_T = \sqrt{F^2 + \hat{F}^2}$. A moment's thought will make it apparent that the signals on lines 54, 54a – d are equivalent to the signals produced at the output of frequency spectrum generator 40 (FIG. 1) when the function generator 36 of modulator 32 (FIG. 1) uses the functions shown in FIG. 2B during the "track mode." Consequently, by feeding the signals produced on lines 54, 54a – d of frequency spectrum generator 40' (FIG. 6) to Doppler frequency detector and bandpass filter 46 (FIG. 1) and target angle computer 100 (FIG. 1) target tracking data can be produced in the manner previously described.

While the invention has been described for use in a pulsed Doppler radar system, as will now be obvious to one of ordinary skill in the art the invention may be used in CW radar systems or in other signal receivers used for tracking selected targets by Doppler frequencies associated with such selected targets. Likewise, other modifications to the digital processing apparatus may be made, as the use of serial processing instead of the parallel processing technique described herein. Also, the function generator may be modified to provide other functions as cosine square. It is felt, therefore, that this invention should not be restricted to the disclosed embodiments, but rather should be limited only by the spirit and scope of the following claims.

What is claimed is:

1. In a conical scan receiver, wherein the angular deviation of a target from a boresight axis and a reference axis is determined, angle computing apparatus comprising:
   a. means for separating energy in signals received from various objects and the target into several signal channels, the relative level of the energy in each such signal channel being in accordance with the angular deviation of each one of the various objects and the target from the boresight axis and the reference axis;
   b. means, disposed in the several signal channels, for substantially inhibiting energy other than that related to the target from passing through the several signal channels; and,
   c. means, fed by the inhibiting means, for comparing the relative level of energy between selected outputs of such signal channels.

2. The angle computing apparatus recited in claim 1 wherein the inhibiting means includes:
   a. means, fed by the separating means, for transforming the signals from the various objects and the target into a set of digital signals, the signals in such set representing the frequency spectrum of the signals from the various objects and the target; and
   b. means, fed by the transforming means, for passing selected ones of the set of digital signals, such selected ones being representative of the portion of the frequency spectrum associated with the target.

3. A conical scan receiver wherein the angular deviation of a target from a boresight axis and a reference axis is determined, such conical scan receiver operating at a conical scanning frequency and including an "in phase" heterodyne receiver and a "quadrature" heterodyne receiver for receiving signals from a target and various objects and computing apparatus, such apparatus comprising:
   a. modulating means, fed by the "in phase" heterodyne receiver and the "quadrature" heterodyne receiver, for applying, to the signals produced at the output of each one of such receivers, modulating signals having a frequency component equal to the conical scanning frequency to produce a set of first signals and a set of second signals, the energy in such sets of signals being in accordance with the angular deviation of each one of the various objects and the target from the boresight axis and the reference axis;
   b. filter means, fed by the modulating means, for inhibiting substantially all of the energy in the sets of first and second signals associated with the various objects from passing through such filter means; and,
   c. means, fed by the filter means, for measuring the relative energy in selected portions of the filtered sets of first and second signals.

4. The conical scan receiver recited in claim 3 wherein the filter means includes:
   a. means, fed by the modulating means, for transforming the sets of signals from the various objects and the target into digital signals, such digital signals representing the frequency spectrum of the signals from the various objects and the target; and
   b. means, fed by the transforming means, for passing selected ones of the digital signals, such selected ones being representative of the portion of the frequency spectrum associated with the target.

5. The conical scan receiver recited in claim 4 wherein the passing means includes:
   a. means for determining the digital signal associated with the frequency component within a portion of the frequency spectrum and having substantially the largest energy level of all frequency components within such portion;
   b. means, fed by the determining means, for transmitting the digital signals representing the frequency components within a predetermined band of frequencies, such band of frequencies being centered at frequency associated with the frequency component having the largest energy level.

6. The conical scan receiver recited in claim 5 wherein the transforming means includes means for separating the digital signals into a frequency portion signal and an energy level portion signal and wherein the determining means includes:
   a. means, coupled to the separating means, for producing a first gating signal when the frequency portion signal is associated with the target;
   b. first register means, coupled to the producing means and the separating means, for storing the energy portion signal in response to the first and a second gating signal;

c. comparator means, coupled to the first register means and the separating means, for producing the second gating signal when such energy level portion signal of the separating means is greater than the energy level portion signal stored in the first register means;

d. second register means coupled to the separating means for storing the frequency portion signal in response to the first and the second gating signals.

* * * * *